United States Patent
Jang (10) Patent No.: US 9,530,118 B2
(45) Date of Patent: Dec. 27, 2016

(54) MESSAGING CLIENT-BASED REMINDERS (75) Inventor: Soobaek Jang, Hamden, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 184 days.

(21) Appl. No.: 13/447,354

(22) Filed: Apr. 16, 2012

(65) Prior Publication Data

US 2013/0275521 A1 Oct. 17, 2013

(51) Int. Cl.
*G06Q 10/10* (2012.01)

(52) U.S. Cl.
CPC .......... *G06Q 10/107* (2013.01); *G06Q 10/109* (2013.01)

(58) Field of Classification Search
CPC ....... G06Q 10/10; H04L 12/585; H04L 12/58; H04L 12/581; H04L 12/5855; G06F 17/60
See application file for complete search history.

(56) References Cited

U.S. PATENT DOCUMENTS

| | | | |
|---|---|---|---|
| 6,272,532 B1 * | 8/2001 | Feinleib | 709/206 |
| 6,636,888 B1 * | 10/2003 | Bookspan et al. | 709/203 |
| 6,943,671 B2 | 9/2005 | McGee et al. | |
| 7,512,901 B2 | 3/2009 | Vong et al. | |
| 7,584,258 B2 | 9/2009 | Maresh | |
| 7,738,897 B2 | 6/2010 | Tillet et al. | |
| 7,739,344 B2 | 6/2010 | Hui et al. | |
| 7,752,278 B2 | 7/2010 | Hui et al. | |
| 7,774,407 B2 | 8/2010 | Daly et al. | |
| 7,821,874 B2 * | 10/2010 | Liu et al. | 368/10 |
| 7,853,471 B2 * | 12/2010 | Zurko et al. | 705/7.19 |
| 8,346,590 B2 | 1/2013 | Norton et al. | |
| 2004/0078441 A1 | 4/2004 | Malik et al. | |
| 2004/0128181 A1 * | 7/2004 | Zurko et al. | 705/9 |
| 2005/0114777 A1 * | 5/2005 | Szeto | 715/710 |
| 2006/0047770 A1 * | 3/2006 | Marappan et al. | 709/207 |
| 2007/0168447 A1 | 7/2007 | Chen et al. | |
| 2008/0086431 A1 | 4/2008 | Robinson et al. | |
| 2008/0270916 A1 | 10/2008 | Chen et al. | |
| 2011/0196742 A1 * | 8/2011 | Holal et al. | 705/14.54 |
| 2013/0110940 A1 | 5/2013 | Pasquero et al. | |

FOREIGN PATENT DOCUMENTS

CN 201030706 Y * 3/2008

OTHER PUBLICATIONS

Dey et al. (CyberMinder, a contex aware system for supporting reminders, 2000, Springer Verlag berlin Heidelberg, p. 172 to 186).*

(Continued)

*Primary Examiner* — Kevin Bates
*Assistant Examiner* — Jeyanath Jeyaratnam
(74) *Attorney, Agent, or Firm* — Cantor Colburn LLP (57) ABSTRACT

Implementing messaging client-based reminders includes monitoring, via a computer processor, a communication exchange for a communication session and determining an occurrence of an alarm event from contents of the communication exchange in response to the monitoring. Upon determining the occurrence of the alarm event, a reminder is generated and a timer is set indicating a time value corresponding to a time expression in the communication exchange. Upon expiration of the timer, the reminder is transmitted.

12 Claims, 3 Drawing Sheets

(56) References Cited

OTHER PUBLICATIONS

IBM, "Return Time for Online Status of IM Applications", IPCOM000136041D [http://www.ip.com/pubview/IPCOM000136041D] pp. 1-2, (May 2006).
Non Final Office Action for U.S. Appl. No. 13/564,436, mailed Jan. 16, 2014, 33 pages.
U.S. Appl. No. 13/564,436; Final Office Action; Date Filed: Aug. 1, 2012; Date Mailed: Jul. 1, 2014; 28 pages.

* cited by examiner

MESSAGING CLIENT-BASED REMINDERS

BACKGROUND

The present invention relates to electronic messaging and, more particularly, to messaging client-based reminders.

Messaging systems, such as email, text messaging, and instant messaging are common tools for implementing daily communications. Some messaging systems, for example instant messaging, provide the ability for a user to initiate and simultaneously conduct multiple separate communication sessions using a single messaging client. In a virtual chat room, for example, a user can open multiple dialog boxes on a display screen for each active chat session. Oftentimes these communications result in some expectation in which one of the parties to a session requests information or commits to providing some information to another party to the session. While the user subject to the commitment may have every intention of fulfilling the request for information, oftentimes the user becomes distracted, e.g., by other ongoing chat sessions or some external stimulus.

SUMMARY

According to further embodiment of the present invention, a system for implementing messaging client-based reminders is provided. The system includes a computer processor and logic executable by the computer processor. The logic is configured to implement a method. The method includes monitoring a communication exchange for a communication session and determining an occurrence of an alarm event from contents of the communication exchange in response to the monitoring. Upon determining the occurrence of the alarm event, the method includes generating a reminder and setting a timer indicating a time value corresponding to a time expression in the communication exchange. Upon expiration of the timer, the method includes transmitting the reminder.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments relate to messaging client-based reminders, which provide the ability for messaging clients to autonomously establish reminders that are contextually based on a communication session occurring via the messaging clients. The reminders may be initiated or configured by the logic that is coupled to, or integrated with, the messaging clients.

Figure 1:
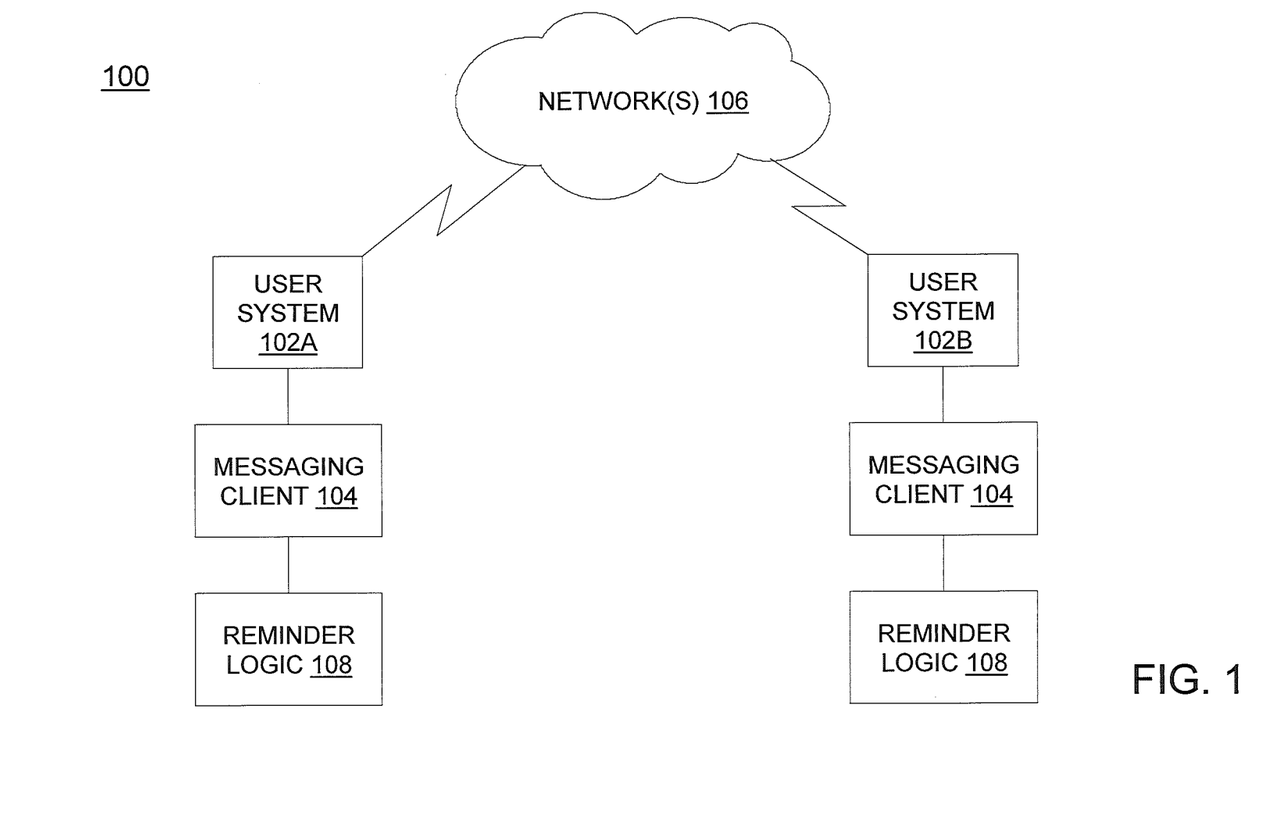
FIG. 1 a block diagram of a system for implementing messaging client-based reminders according to an embodiment.

Turning now to FIG. 1, a system 100 upon which the exemplary messaging client-based reminders may be implemented will now be described. The system 100 of FIG. 1 depicts two user devices 102A and 102B communicatively coupled to one or more network(s) 106. Two user devices 102A and 102B are shown by way of non-limiting example. It will be understood that any number of user devices 102 may be employed in realizing the advantages of the exemplary embodiments described herein.

The user devices 102A and 102B may include portable, wireless communication devices, such as smart phones, personal digital assistants, and tablet PCs, or may be wired devices, such as general-purpose computers, laptops, and host-attached terminals.

The user devices 102A and 102B each include processing circuits and I/O interfaces, such as a keyboard, a display device and network interface. The user devices 102A and 102B can include various computer hardware and software technology known in the art, such as one or more processing units or circuits, volatile and non-volatile memory including removable media, power supplies, network interfaces, support circuitry, operating systems, and the like.

Each of the user devices 102A and 102B executes a messaging client 104, which may be any communications messaging application, such as an instant messenger, a text messenger, voice communication, email, etc. The user devices 102A and 102B are network-enabled such that they are capable of communicating over the network(s) 106 with each another via the respective messaging clients 104 and an Internet Service Provider (ISP) (not shown) that resides in the network(s) 106.

In an embodiment, reminder logic 108 is executable by each of the user systems 102A and 102B. The reminder logic 108 may be an add-on or plug-in to an existing (e.g., off-the-shelf) messaging client, such as messaging client 104. Alternatively, the reminder logic 108 may be integrated with a messaging client, which operates as a single software application. The reminder logic 108 implements the exemplary messaging client-based reminders described herein. Each of the user systems 102A and 102B include a timing mechanism (not shown), such as an internal clock. The timing mechanism is employed by the reminder logic 108 as will be described further herein.

The network(s) 106 may be any type of known networks including, but not limited to, a wide area network (WAN), a local area network (LAN), a global network (e.g. Internet), a virtual private network (VPN), and an intranet. The network(s) 406 may be implemented using a wireless network or any kind of physical network implementation known in the art, e.g., using cellular, satellite, and/or terrestrial network technologies.

As described above, the exemplary messaging client-based reminders provide the ability for messaging clients to establish reminders that are contextually based on a communication session occurring via the messaging clients. The reminders may be autonomously generated by logic coupled to, or integrated with, the messaging clients. In an exemplary embodiment, the reminders are created by the reminder logic 108 absent any explicit or overt action by the end users to generate the reminders. In addition, the reminder logic 108 may be configured to enable end users to specify preferences with regard to the manner of transmitting a reminder (e.g., by voice communication, text message, email, etc.).

Figure 2:
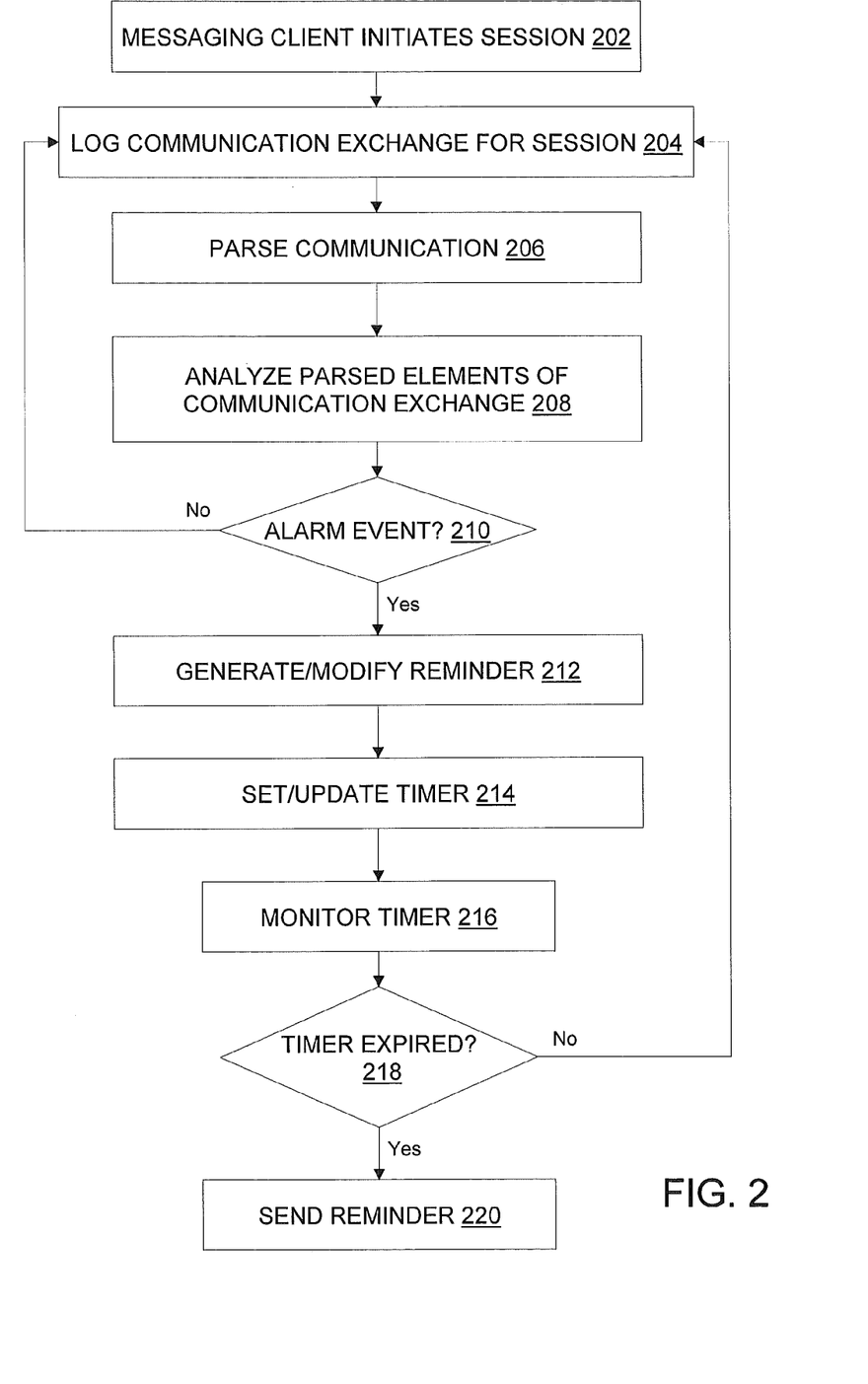
FIG. 2 depicts a flow diagram of a process for implementing messaging client-based reminders according to an embodiment.

Turning now to FIG. 2, a process for implementing the messaging client-based reminders will now be described in an exemplary embodiment. For purposes of illustration, and by way of non-limiting example, the processes described in FIG. 2 assume that the messaging clients 104 are instant messengers.

Figure 3:
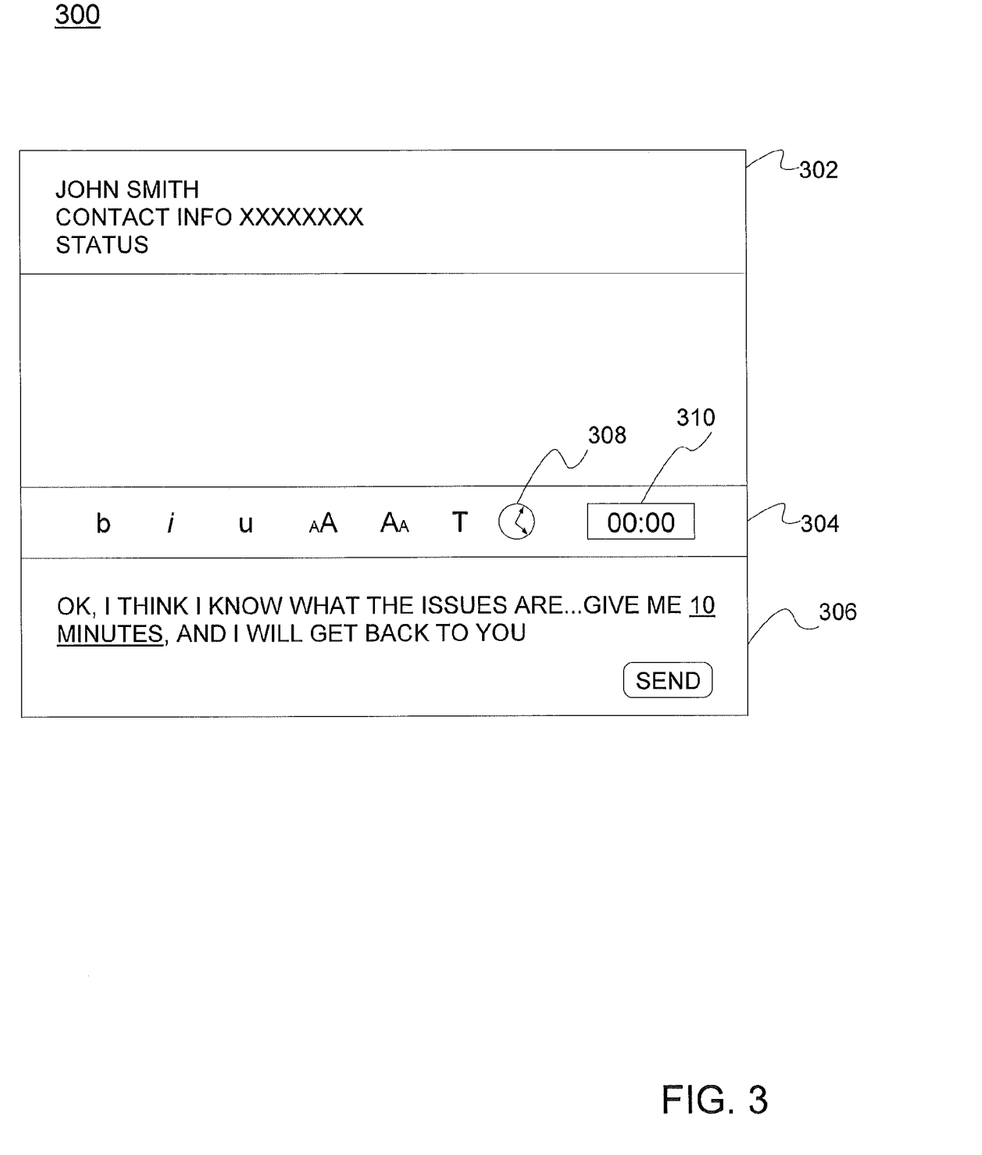
FIG. 3 depicts a computer screen window used in implementing the messaging client-based reminders according to an embodiment.

At step 202, one of the user systems 102A and 102B initiates a communication session (e.g., chat session) with the other of the user systems 102A and 102B. The messaging clients 104 present a display screen on the user systems 102A and 102B, and the reminder logic 108 incorporates additional functionality, which is described further herein. A sample computer screen window 300 for either of the user systems 102A and 102B is shown in FIG. 3.

At step 204, the reminder logic 108 logs the communication exchange that occurs between the user systems 102A and 102B (i.e., the reminder logic 108 executing on both user systems 102A and 102B may log both sides of the communication session occurring between the two messaging clients 104). The logged communication may be temporarily stored on the respective user systems 102A and 102B in memory. The communication exchange can include any alphanumeric input from the respective end users of the user systems 102A and 102B. Sample input from one of the end users, which represents a portion of the communication exchange for a communication session, is shown in a dialog panel 306 in FIG. 3 for illustration.

At step 206, the reminder logic 108 parses the communication exchange from the logged information. The parsed elements of the communication exchange are analyzed by the reminder logic 108 in order to identify any attributes therein that may signify an alarm event. For example, the reminder logic 108 may be configured to search or filter the logged information for expressions of time and/or an intent to further communication with the other party to the communication session at some future time. Expressions of time and intent can include pre-defined phrases, such as "I will get back to you . . . 10 minutes" or "Let me check on this and call you later . . . " or may be a combination of contextually related words that suggest an intent or commitment to resume a communication at a future point in time. A combination of select words, phrases, and/or time elements may be indicative of a commitment or intent by the communicator to continue or re-establish communication at some future time.

At step 210, the reminder logic 108 determines whether an alarm event has occurred from the analysis performed in step 208. If not, the process returns to step 204 and the communication exchange continues to be logged by the reminder logic 108. Otherwise, if an alarm event has been determined, the reminder logic 108 generates a reminder at step 212. The reminder may include elements parsed from communication session that are determined by the reminder logic 108 to be relevant. Using the example communication exchange shown in panel 306 of FIG. 3, a sample reminder may be "It has been 10 minutes since you communicated with <user name>. A follow up communication is requested." The reminder may be more specific if enough information is provided in the communication exchange for the reminder logic 108 to create a detailed reminder. For example, the reminder may include particular information that was requested by one of the parties during the communication session. As indicated above, the determination of whether an alarm event has occurred is performed autonomously by the reminder logic 108 absent any overt request or action on the part of either of the end users to the communication session. In fact, the end users may not even be aware of the processing performed by the reminder logic 108.

At step 214, the reminder logic 108 sets a timer (e.g., using the internal clock of the corresponding user system) from the parsed elements in the communication exchange, e.g., "10 minutes". An icon 310 for a sample timer is shown in FIG. 3 within a toolbar 304 of the messaging client 104.

Alternatively, at step 212, a previously existing reminder may be modified, for example, when an initial reminder has been generated, a timer has been set, and the communication session has continued, whereby one of the end users to the session has requested or indicated more time is needed to provide the subject information. In this instance, step 214 indicates the timer is updated to reflect the change to the time expression. The update may include adding additional time to the timer or canceling the timer. This modification is described further herein.

At step 216, the timer is monitored to track the amount of time passing from the time the device is set. In response to monitoring the timer, the reminder logic 108 determines whether the timer has expired at step 218. If not, the process returns to step 204, whereby the reminder logic 108 continues to log the communication exchange if still active (e.g., one end user may be waiting during the active session while the other end user looks for an answer to a question). The steps 206-210 are repeated and, if the alarm event changes, e.g., due to analysis of ongoing communication information that results in a change to the alarm event (e.g., the end user requiring additional time above what was indicated in the first alarm event, or the end user canceling the alarm event altogether), the timer is adjusted accordingly.

If the timer has expired at step 218, the reminder logic 108 sends the reminder generated in step 208 to a corresponding one or both of the user systems 102A and 102B at step 220. The determination of where to send the reminder may be implemented based on the context of the communication session or may be established according to user preference. For example, in one embodiment, where the user system 102A represents the end user who has indicated he/she will get back to the other end user, the reminder logic 108 operating on the user system 102A may generate and send a reminder that states, "It has been 10 minutes. Please contact <user name> as indicated in your earlier communication session." Likewise, the reminder logic 108 operating on the user system 102B may generate and send a reminder that states, "It has been 10 minutes. Would you like to re-establish a communication session with <user name>?" Or, the reminder may state, "It has been 10 minutes. Would you like to send a reminder to <user name>?"

The reminder may be displayed on the display screen of the computer screen window 300 or, if pre-defined preferences have been established by the end users via the reminder logic 108, the reminder logic 108 may generate and send the reminder by any means selected by the end users, such as by email, text message, or cellphone.

As described above, the exemplary messaging client-based reminders may be configured to autonomously analyze a communication session and automatically generate reminders. In another embodiment, the messaging client-based reminders may be configured such that an end user may actively generate a reminder. For example, the reminder logic 108 may be configured to provide an option, such as on the toolbar 304 of FIG. 3, which when activated, allows the end user to create his/her own reminder. A sample icon 308 is shown in toolbar 304 for this purpose. In one embodiment, the end user selects the icon 308, and the reminder logic 108 prompts the user to enter a time value, such as 10 minutes. The reminder logic 108 may be configured to associate the reminder with the current communication session occurring on the user system 102.

Technical effects include messaging client-based reminders, which provide the ability for messaging clients to establish reminders that are contextually based on a communication session occurring via the messaging clients. The reminders may be initiated or configured autonomously by logic coupled to, or integrated with, the messaging clients.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for subsequently reminding a first participant of an interactive communication session that the first participant volunteered or was assigned to perform a follow up action, the method comprising the steps of:
    establishing user preferences for transmission of a reminder, the user preferences including a transmission means for transmitting the reminder, the transmission means including email and at least one of text message, voice message, and instant message;
    monitoring, by a computer, the interactive communication session and determining, from one or more contextually related word of text entered into the interactive communication session by the first participant or by a second participant of the interactive communication session, that the first participant volunteered or was assigned to perform a first follow up action, the interactive communication session conducted between the first participant and the second participant, the contextually related words corresponding to an expression of time and an intent to further a communication as determined from contextually related words identified in parsed elements of the interactive communication session;
    the computer searching text subsequently entered into the interactive communication session between the first participant and the second participant for one or more contextually related words indicating that the first follow up action has been performed;
    upon determining, in response to (a) passage of a predetermined amount of time, and (b) absence of the one or more contextually related words entered in the interactive communication session indicating that the first follow up action has been performed, the computer automatically reminding the first participant of the first follow up action, and the computer sending notification to the second participant to remind the second participant that the first follow up action is pending; and
    upon determining from the contextually related words of the subsequently entered text that the first participant has volunteered or was assigned to perform a second, different follow up action that supersedes the first follow up action, automatically reminding the first participant of the second follow up action and abstaining from reminding the first participant of the first follow up action;
    wherein the automatically reminding the first participant of one of the first follow up action and the second follow up action includes determining, from the context of the interactive communication session, which party to the interactive communication session to transmit the reminder;
    wherein a reminder associated with a corresponding one of the first follow up action and the second follow up action includes a portion of the parsed elements found in the communication session; and
    upon determining from the contextually related words of the subsequently entered text, entered in the interactive communication session, that the completion status indicates the first follow up action has been completed, abstaining from reminding the first participant of the first follow up action.

2. The method of claim 1, wherein the reminder is a first reminder, the method further comprising the steps of:
    sending a second, different reminder to the second participant, the second, different reminder including a request to send the first reminder to the first participant.

3. The method of claim 1, wherein the interactive communication session is implemented by an email application.

4. The method of claim 1, wherein the interactive communication session is implemented by an instant messenger application.

5. A computer program product for subsequently reminding a first participant of an interactive communication session that the first participant volunteered or was assigned to perform a follow up action, the computer program product comprising:
    one or more computer-readable storage devices and program instructions stored on the one or more storage devices, the program instructions comprising:
    program instructions to establish user preferences for transmission of a reminder, the user preferences including a transmission means for transmitting the reminder, the transmission means including email and at least one of text message, voice message, and instant message;
    program instructions to monitor the interactive communication session and determine, from one or more contextually related words of text entered into the interactive communication session by the first participant or by a second participant in the interactive communication session, that the first participant volunteered or was assigned to perform a first follow up action, the interactive communication session conducted between the first participant and the second participant, the one or more contextually related words corresponding to an expression of time and an intent to further a communication as determined from contextually related words identified in parsed elements of the interactive communication session;

program instructions to, prior to automatically reminding the first participant to perform the first follow up action, search subsequently entered text of the interactive communication session between the first participant and the second participant for one or more other contextually related words indicating a completion status of the first follow up action;

program instructions to, subsequently, in response to (a) passage of a predetermined amount of time, and (b) absence of the one or more contextually related words entered in the interactive communication session indicating that the first follow up action has been performed, the computer automatically reminding the first participant of the first follow up action, and the computer sending notification to the second participant to remind the second participant that the first follow up action is pending; and program instructions to, upon determining from the one or more other contextually related words of the subsequently entered text that the first participant has volunteered or was assigned to perform a second, different follow up action that supersedes the first follow up action, automatically remind the first participant of the second follow up action and abstain from reminding the first participant of the first follow up action;

wherein the automatically reminding the first participant of one of the first follow up action and the second follow up action includes determining, from the context of the interactive communication session, which party to the interactive communication session to transmit the reminder;

wherein a reminder associated with a corresponding one of the first follow up action and the second follow up action includes a portion of the parsed elements found in the communication session; and program instructions to, upone determining from the one or more other contextually related words of the subsequently entered text, entered in the interactive communication session, that the completion status indicates the first follow up action has been completed, abstain from reminding the first participant of the first follow up action.

6. The computer program product of claim 5, wherein the reminder is a first reminder, and the program instructions further comprise:

program instructions to send a second, different reminder to the second participant, the second, different reminder including a request to send the first reminder to the first participant.

7. The computer program product of claim 5, wherein the interactive communication session is implemented by voice message tool.

8. A computer system for subsequently reminding a first participant of an interactive communication session that the first participant volunteered or was assigned to perform a follow up action, the computer system comprising: one or more processors, one or more computer-readable memories, one or more computer-readable storage devices, and program instructions stored on the
one or more storage devices for execution by the one or more processors via at least one of the one or more memories, the program instructions comprising:
first program instructions to establish user preferences for transmission of a reminder, the user preferences including a transmission means for transmitting the reminder, the transmission means including email and at least one of text message, voice message, and instant message;
second program instructions to monitor the interactive communication session and determine, from one or more contextually related words of text entered into the interactive communication session by the first participant or by a second participant of the interactive communication session, that the first participant volunteered or was assigned to perform a first follow up action, the interactive communication session conducted between the first participant and the second participant, the one or more contextually related words corresponding to an expression of time and an intent to further a communication as determined from contextually related words identified in parsed elements of the interactive communication session;
third program instructions to search text subsequently entered into the interactive communication session between the first participant and the second participant for one or more contextually related words indicating that the first follow up action has been performed;
fourth program instructions to subsequently, in response to (a) passage of a predetermined amount of time, and (b) absence of the one or more contextually related words entered in the interactive communication session indicating that the first follow up action has been performed, the computer automatically reminding the first participant of the first follow up action, and the computer sending notification to the second participant to remind the second participant that the first follow up action is pending; and
fifth program instructions to, upon determining from the one or more contextually related words of the subsequently entered text that the first participant has volunteered or was assigned to perform a second, different follow up action that supersedes the first follow up action, automatically remind the first participant of the second follow up action and abstain from reminding the first participant of the first follow up action; wherein the automatically reminding the first participant of one of the first follow up action and the second follow up action includes determining, from the context of the interactive communication session, which party to the interactive communication session to transmit the reminder;
wherein a reminder associated with a corresponding one of the first follow up action and the second follow up action includes a portion of the parsed elements found in the communication session; and
sixth program instructions to, upon determining from the one or more contextually related words of the subsequently entered text, entered in the interactive communication session, that the completion status indicates the first follow up action has been completed, abstain from reminding the first participant of the first follow up action.

9. The computer system of claim 8, wherein the reminder is a first reminder, and the program instructions comprise:
seventh program instructions to send a second, different reminder to the second participant, the second, different reminder including a request to send the first reminder to the first participant.

10. The computer system of claim 8, wherein the interactive communication session is implemented by text messenger.

11. The computer system of claim 8, wherein the program instructions further comprise:
 ninth program instructions to set a timer on a device of the first participant that corresponds with the reminder.

12. The method of claim 1, wherein the contextually related words include particular information requested by one of the first participant and the second participant, and the reminder identifies the particular information.

\* \* \* \* \*